United States Patent
Kroyan et al.

(10) Patent No.: US 10,155,172 B2
(45) Date of Patent: *Dec. 18, 2018

(54) ROBOTIC ACTIVITY SYSTEM USING COLOR PATTERNS

(71) Applicant: Evollve, Inc., Redondo Beach, CA (US)

(72) Inventors: Armen Kroyan, Redondo Beach, CA (US); Ondrej Stanek, Prague (CZ); Nader Abou-Hamda, Redondo Beach, CA (US)

(73) Assignee: Evollve Inc., Redondo Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/392,974

(22) Filed: Dec. 28, 2016

(65) Prior Publication Data

US 2017/0266574 A1    Sep. 21, 2017

Related U.S. Application Data

(63) Continuation of application No. 14/466,733, filed on Aug. 22, 2014, now Pat. No. 9,545,582.

(Continued)

(51) Int. Cl.
B25J 9/00 (2006.01)
A63H 18/16 (2006.01)
(Continued)

(52) U.S. Cl.
CPC ............. *A63H 18/16* (2013.01); *A63H 17/36* (2013.01); *B25J 9/1684* (2013.01); *B25J 9/1697* (2013.01);
(Continued)

(58) Field of Classification Search
CPC combination set(s) only.
See application file for complete search history.

(56) References Cited

U.S. PATENT DOCUMENTS 3,303,607 A  2/1967 Zalkind
4,618,254 A  10/1986 Therrien et al.
(Continued)

FOREIGN PATENT DOCUMENTS

GB  2475273  5/2011
JP  2006340853  12/2006
(Continued)

OTHER PUBLICATIONS

Extended European Search Report, dated Nov. 23, 2015, European Application No. 13784531.

(Continued)

*Primary Examiner* — Jonathan L Sample
(74) *Attorney, Agent, or Firm* — Womble Bond Dickinson (US) LLP

(57) ABSTRACT

A robotic activity system, which includes a board and an autonomous robotic device, is described herein. The board may display a line and one or more color patterns. The robotic device may traverse the line using one or more integrated sensors. For example, sensor data may include light intensity data for visible light reflected or emitted by the board. The sensor data may be analyzed to 1) ensure the robotic device follows the line and/or 2) detect color sequences associated with color patterns shown on the board. Upon detection of a color sequence, the robotic device may attempt to match the color sequence with a known color pattern definition. The color pattern definition may be associated with a function to be performed by the robotic device. Using multiple sets of color patterns and associated functions allows the robotic device to move in a variable and potentially unpredictable fashion.

16 Claims, 15 Drawing Sheets

Related U.S. Application Data

(60) Provisional application No. 61/888,344, filed on Oct. 8, 2013, provisional application No. 61/869,566, filed on Aug. 23, 2013.

(51) Int. Cl.
*A63H 17/36* (2006.01)
*B25J 9/16* (2006.01)
*G06F 3/041* (2006.01)

(52) U.S. Cl.
CPC ............ *G06F 3/041* (2013.01); *Y10S 901/01* (2013.01); *Y10S 901/47* (2013.01)

(56) References Cited

U.S. PATENT DOCUMENTS

| | | | |
|---|---|---|---|
| 4,627,511 A * | 12/1986 | Yajima | G05D 1/0242 180/167 |
| 4,658,928 A | 4/1987 | Seo | |
| 5,596,255 A * | 1/1997 | Miyazawa | G05D 1/0225 318/568.12 |
| 6,002,125 A * | 12/1999 | Schubert | B25J 9/1697 250/223 R |
| 6,088,469 A * | 7/2000 | Fukumura | G06K 9/3216 382/103 |
| 6,505,098 B1 * | 1/2003 | Sakamoto | A63H 3/52 700/215 |
| 6,632,122 B2 | 10/2003 | Klitsner et al. | |
| 6,695,668 B2 | 2/2004 | Donahue et al. | |
| 6,771,813 B1 * | 8/2004 | Katsuyama | G06K 9/00463 345/589 |
| 6,796,873 B1 | 9/2004 | Tsao | |
| 7,014,525 B2 | 3/2006 | Abe et al. | |
| 7,286,702 B2 * | 10/2007 | Oohara | G09G 5/02 382/162 |
| 7,532,743 B2 * | 5/2009 | Morisada | G06K 9/00228 318/568.12 |
| 7,607,983 B2 | 10/2009 | Nakajima et al. | |
| 7,758,399 B2 | 7/2010 | Weiss et al. | |
| 8,781,627 B2 * | 7/2014 | Sandin | G05D 1/028 700/258 |
| 8,932,133 B2 | 1/2015 | Cortenraad et al. | |
| 9,098,744 B2 * | 8/2015 | Tongprasit | G06K 9/00664 |
| 9,360,300 B2 * | 6/2016 | DiBernado | G01S 5/163 |
| 2002/0102910 A1 | 8/2002 | Donahue et al. | |
| 2003/0130851 A1 * | 7/2003 | Nakakita | A63H 3/28 704/275 |
| 2004/0138780 A1 * | 7/2004 | Lewis | B25J 13/081 700/245 |
| 2005/0065650 A1 * | 3/2005 | Lewis | B25J 13/081 700/245 |
| 2005/0251292 A1 * | 11/2005 | Casey | G05D 1/0238 700/245 |
| 2006/0079997 A1 * | 4/2006 | McLurkin | G05D 1/0297 700/245 |
| 2006/0293810 A1 * | 12/2006 | Nakamoto | G05D 1/0234 701/28 |
| 2007/0146383 A1 * | 6/2007 | Bayramoglu | G01J 3/50 345/589 |
| 2007/0156286 A1 * | 7/2007 | Yamauchi | G05D 1/0038 700/245 |
| 2008/0144978 A1 * | 6/2008 | Yourlo | B41J 3/28 382/321 |
| 2008/0211183 A1 | 9/2008 | Cortenraad et al. | |
| 2008/0285842 A1 * | 11/2008 | Plasberg | G01S 17/026 382/154 |
| 2008/0310677 A1 | 12/2008 | Weismuller et al. | |
| 2008/0320419 A1 | 12/2008 | Matas et al. | |
| 2009/0118890 A1 * | 5/2009 | Lin | G05D 1/0246 701/28 |
| 2009/0167727 A1 * | 7/2009 | Liu | G06F 3/03545 345/179 |
| 2010/0053120 A1 * | 3/2010 | Chang | G06F 3/03545 345/179 |
| 2010/0230198 A1 | 9/2010 | Frank et al. | |
| 2010/0304640 A1 | 12/2010 | Sofman et al. | |
| 2011/0046780 A1 | 2/2011 | Anderson | |
| 2012/0033085 A1 * | 2/2012 | Bayramoglu | G01J 3/506 348/177 |
| 2013/0226344 A1 * | 8/2013 | Wong | G05D 1/024 700/258 |
| 2013/0288560 A1 * | 10/2013 | Abou-Hamda | A63H 33/005 446/175 |
| 2013/0310956 A1 * | 11/2013 | Rehkemper | G05D 1/0234 700/83 |
| 2014/0005830 A1 * | 1/2014 | Ogawa | B25J 9/1602 700/257 |
| 2014/0124004 A1 * | 5/2014 | Rosenstein | A47L 9/2852 134/18 |
| 2014/0129027 A1 * | 5/2014 | Schnittman | G05D 1/0219 700/253 |

FOREIGN PATENT DOCUMENTS

| | | |
|---|---|---|
| WO | WO-0115059 | 3/2001 |
| WO | WO-2006120633 | 11/2006 |

OTHER PUBLICATIONS

Non-Final Office Action, dated Oct. 18, 2016, U.S. Appl. No. 13/645,039.
U.S. Notice of Allowance, dated Aug. 10, 2016, U,S, Appl. No. 14/466,733.
Non-Final Office Action (dated Aug. 18, 2015) U.S. Appl. No. 14/466,733, filed Aug. 22, 2014, First Named Inventor: Armen Kroyan, 11.
Final Office Action (dated Mar. 1, 2016), U.S. Appl. No. 13/645,039, filed Oct. 4, 2012, First Named Inventor: Nader Abou-Hamda, 12.
Final Office Action (dated Mar. 31, 2016), U.S. Appl. No. 14/466,733, filed Aug. 22, 2014, First Named Inventor: Armen Kroyan, 16.
""Photo resistor" description", published at URL <http://www.resistorguide.com/photoresistor/>, 3 pages.
""Voltage Dividers" description", Published on or before Aug. 30, 2011 printed from URL <https://web.archive.org/web/20110830220618/http://www.doctronics.co.uk/voltage.htm>, 11 pages.
Abou-Hamda, Nader, "Notification of Transmittal of the International Search Report and Written Opinion of the International Searching Authority, or the Declaration", International Application No. PCT/US2013/037434, dated Sep. 4, 2013.
Evollve, Inc., "Non-Final Office Action", U.S. Appl. No. 13/645,039, dated Jul. 14, 2015, 24 pages.
Hobbizine, "Robot Design-Analog Sensors and the MSP430 Launchpad", Retrieved Using Internet Archive <http://web.archive.org/web/20120119022315/http://robotics.hobbizine.com/ldrlaunch/html>.

* cited by examiner

Time T1

Time T2

Time T3

ROBOTIC ACTIVITY SYSTEM USING COLOR PATTERNS

CROSS-REFERENCE TO RELATED APPLICATIONS

This application is a continuation of U.S. application Ser. No. 14/466,733, filed Aug. 22, 2014, which claims the benefit of the earlier filing date of U.S. Provisional Application No. 61/869,566, filed Aug. 23, 2013 and U.S. Provisional Application No. 61/888,344, filed Oct. 8, 2013.

FIELD

A robotic device that detects color patterns using a set of color/light sensors and performs functions associated with each pattern is described. Other embodiments are also described herein.

BACKGROUND

With the proliferation of high powered microchips, portable computing platforms have become ubiquitous in many parts of society. In particular, many individuals rely heavily on tablet computers and mobile telephones for various tasks, including gaming and other pastime activities. Although mobile computing devices are well equipped to offer computational intensive audio-visual virtual environments, these devices lack the ability to provide more engaging activities.

In particular, most game and leisure applications running on computing devices require the user to wholly concentrate on a virtual environment presented on a digital display. These virtual experiences provide little tangible or tactile involvement for the user and prevent the user from moving the activity away from the digital display provided by the computing device.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

A robotic activity system, which includes a board and a robotic device, is described herein. In one embodiment, the board may display a line and one or more color patterns. The robotic device may traverse the line using one or more integrated sensors. For example, the robotic device may include a set of color and light sensors that generate sensor data. The sensor data may include light intensity data for visible light reflected or emitted by the board. The sensor data may be analyzed to 1) ensure the robotic device follows the line and/or 2) detect color sequences associated with color patterns shown on the board. Upon detection of a color sequence based on the sensor data, the robotic device may attempt to match the color sequence with a known color pattern definition. The color pattern definition may be associated with a function to be performed by the robotic device. For example, the function may cause the robotic device to 1) change speed, including stopping; 2) rotate by a prescribed degree; 3) flash lights in a prescribed sequence; 4) alter the way an intersection in the line is handled; 5) jump off of the line; 6) perform a zigzag movement; 6) count objects or patterns before conducting a prescribed movement; 7) communicate with another device (e.g., the board, another robotic device, an accessory of the robotic device, or a device external to the robotic activity system); 8) emit sounds; and 9) record sounds or other sensor data. Using multiple sets of color patterns and associated functions allows the robotic device to move in a variable and potentially unpredictable fashion. This varied and random movement of the robotic device may be used for gaming or general amusement.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments are described with reference to the appended drawings are now explained. While numerous details are set forth, it is understood that some embodiments of the invention may be practiced without these details. In other instances, well-known circuits, structures, and techniques have not been shown in detail so as not to obscure the understanding of this description.

Figure 1:
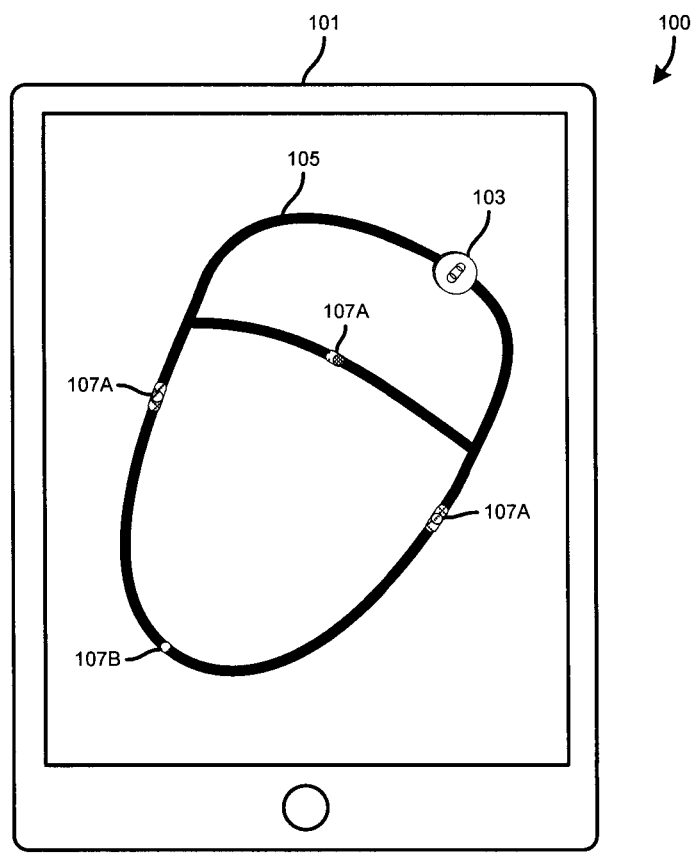
FIG. 1 shows a robotic activity system, including a board and a robotic device, according to one embodiment.

FIG. 1 shows a robotic activity system 100 according to one embodiment. As shown, the robotic activity system 100 includes a board 101 and a robotic device 103. As will be described in greater detail below, the board 101 may display a line 105, including one or more color patterns 107. The robotic device 103 may autonomously traverse the line 105 using one or more integrated sensors. Upon detection of a color pattern 107, the robotic device 103 may perform a corresponding function associated with the detected color pattern 107. Using multiple sets of color patterns 107 allows the robotic device 103 to traverse the line 105 in an autonomous, variable, and potentially unpredictable fashion. This autonomous, varied, and random movement may be used for gaming or general amusement. Each element of the robotic activity system 100 will be described below by way of example.

Figure 2:
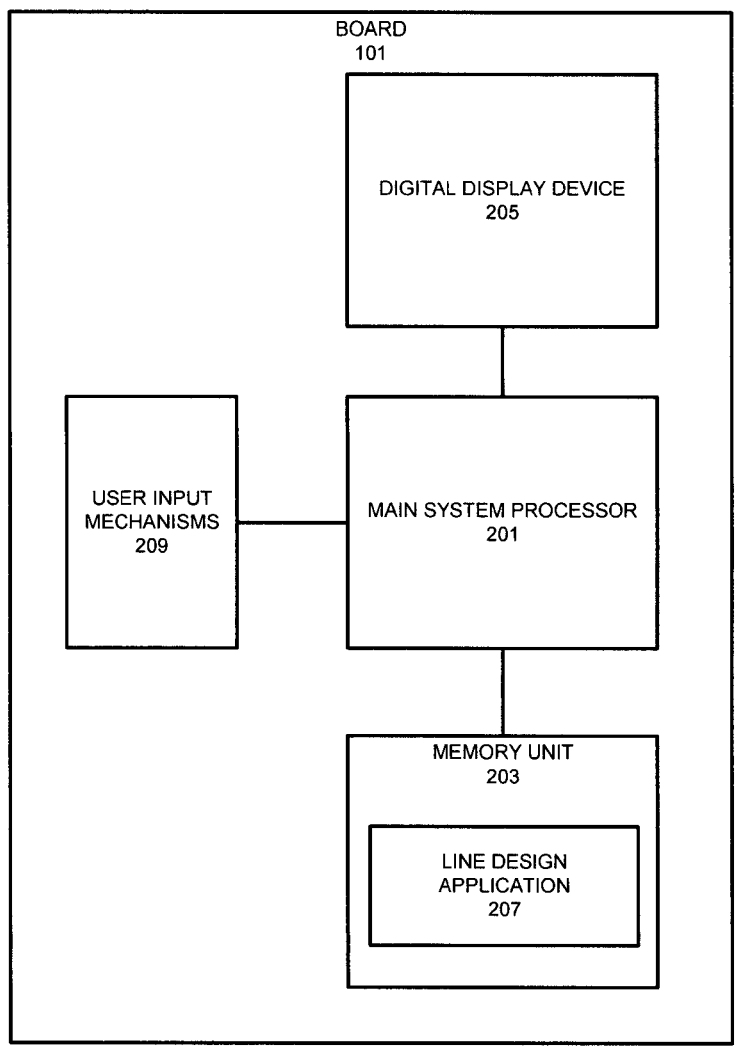
FIG. 2 shows a component diagram of the board according to one embodiment.

In one embodiment, the board 101 may be any apparatus that may display a line 105 and one or more color patterns 107. For example, in some embodiments, the board 100 may be a computing device (e.g., a tablet computer or a mobile phone). FIG. 2 shows a component diagram of the board 101 according to one embodiment. As shown, the board 101 may include a main system processor 201 and a memory unit 203. The processor 201 and memory unit 203 are used here to refer to any suitable combination of programmable data processing components and data storage that conduct the operations needed to implement the various functions and operations of the board 101. The processor 201 may be a special purpose processor such as an application-specific integrated circuit (ASIC), a general purpose microprocessor, a field-programmable gate array (FPGA), a digital signal controller, or a set of hardware logic structures (e.g., filters, arithmetic logic units, and dedicated state machines) while the memory unit 203 may refer to microelectronic, non-volatile random access memory. An operating system may be stored in the memory unit 203, along with application programs specific to the various functions of the board 101, which are to be run or executed by the processor 201 to perform the various functions of the board 101.

The board 101 may also include a digital display device 205 (e.g., a liquid crystal display (LCD), a plasma display, a light emitting diode (LED) display, an organic LED (OLED) display, or any other similar display device that produces a color image). The digital display device 205 may display the line 105 and the color patterns 107. In these embodiments, the line 105 and the color patterns 107 may be formed on the board 101 by a user via a general drawing application or a dedicated line design application 207. For example, the memory unit 203 may include the dedicated line design application 207 that presents a user interface to the user on the digital display device 205. In this embodiment, the user may draw or otherwise form the line 105 within the interface of the line design application 207 using one or more input mechanisms 209 (e.g., a touch display panel, a mouse, a keyboard, a gaming pad/controller, etc.). The user may also add one or more color patterns 107 along and/or adjacent to the line 105 using the interface of the line design application 207. The line 105 and the color patterns 107 may be each a designated width corresponding to the size of the robotic device 103, the potential top speed of the robotic device 103, and/or the placement of sensors on the robotic device 103. The line 105 and the color patterns 107 will be discussed in greater detail below.

Although described above as the board 101 being a digital device, in other embodiments the board 101 may be a non-digital device. For example, the board 101 may be a piece of paper, a piece of cardboard, a whiteboard (i.e., a dry-erase board), a chalkboard, or any other similar device that allows a user to draw the line 105 and the color patterns 107 on a surface of the board 101 and allows the line 105 and the patterns 107 to be traversed by the robotic device 103. In these embodiments, the line 105 and/or the color patterns 107 may be added to the board 101 using colored markers, pens, pencils, paint brushes, chalk, or other similar devices.

In some embodiments, the robotic activity system 100 may include multiple boards 101 that may be traversed by the robotic device 103. For example, the robotic activity system 100 may include a combination of digital and non-digital boards 101 that are adjacent to each other and joined together such that the robotic device 103 may seamlessly move/roll between each board 101.

The robotic device 103 may be any device that uses a set of sensors and an electro-mechanical mechanism to autonomously move across a surface of the board 101 while following the line 105. As used herein, autonomous operation indicates that the robotic device 103 moves entirely based on sensor 305 data and stored logic within the robotic device 103. Accordingly, movement of the autonomous robotic device 103 on the board 101 is without interaction and/or inputs from a human user.

Figure 3A:
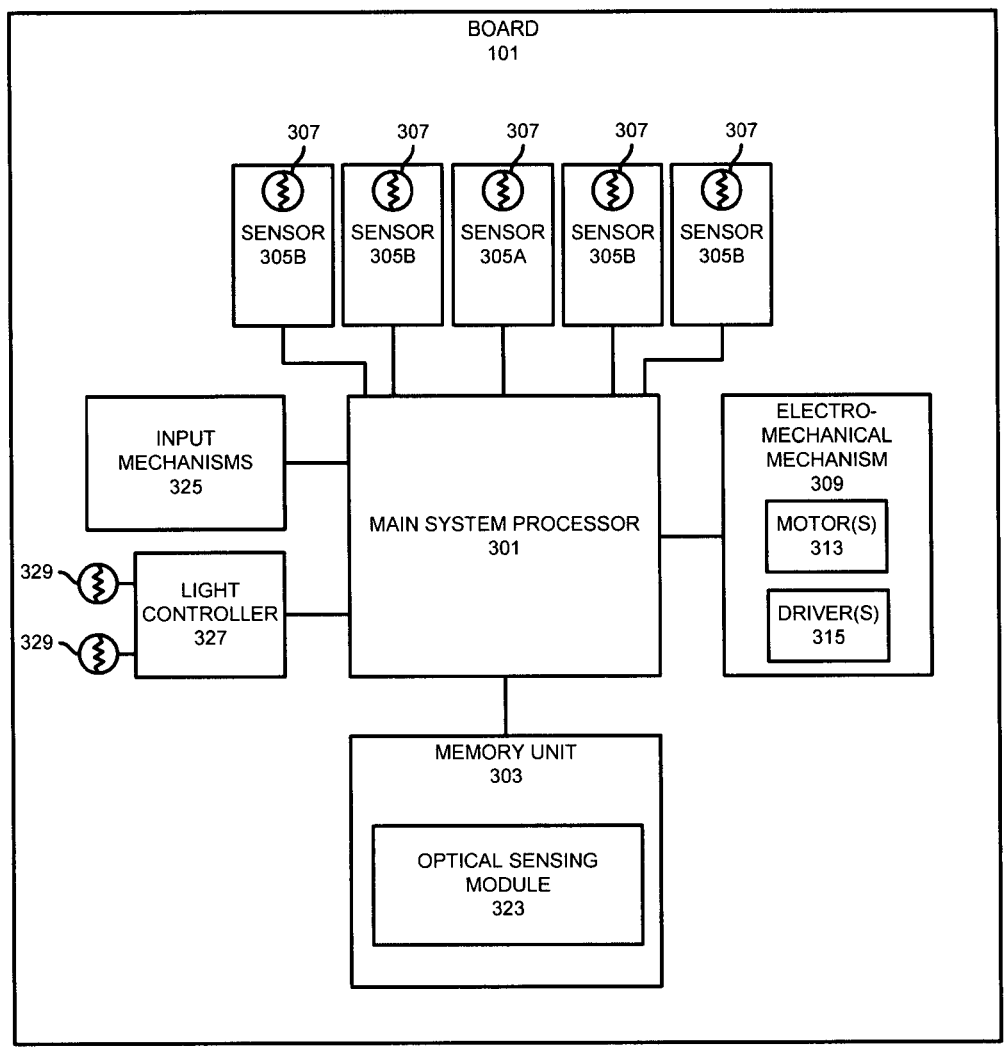
FIG. 3A shows a component diagram of the robotic device according to one embodiment.

FIG. 3A shows a component diagram of the robotic device 103 according to one embodiment. As shown, the robotic device 103 may include a main system processor 301 and a memory unit 303. Similar to the processor 201 and the memory unit 203 of the board 101, the processor 301 and the memory unit 303 are used here to refer to any suitable combination of programmable data processing components and data storage that conduct the operations needed to implement the various functions and operations of the robotic device 103. The processor 301 may be a special purpose processor such as ASIC, a general purpose microprocessor, a FPGA, a digital signal controller, or a set of hardware logic structures (e.g., filters, arithmetic logic units, and dedicated state machines) while the memory unit 303 may refer to microelectronic, non-volatile random access memory. An operating system may be stored in the memory unit 303, along with application programs specific to the various functions of the robotic device 103, which are to be run or executed by the processor 301 to perform the various functions of the robotic device 103. For example, an optical sensing module 323 may be stored in the memory unit 303 and be run/executed by the processor 301. The optical sensing module 323 causes the device 103 to follow the line 105 and perform functions corresponding to detected color patterns 107 as will be described in greater detail below.

The robotic device 103 may include a set of sensors 305, which may be used for traversing the line 105 and/or detecting the color patterns 107. For example, the sensors 305 may include a color sensor 305A and multiple light sensors 305B. The color sensor 305A may be a photoresistor or phototransistor that is capable of measuring the intensity of detected light at various wavelengths. For example, the color sensor 305A may include multiple regions/channels that correspond to different wavelengths. Each channel of the color sensor 305A may detect the intensity of light at a respective wavelength. These separate wavelength specific intensity values may thereafter be used to determine the color of the detected light. For instance, the color sensor 305A may include red, green, blue, and clear channels. The red channel of the color sensor 305A may be associated with a wavelength corresponding to red light (e.g., 650 nanometers), the green channel of the color sensor 305A may be associated with a wavelength corresponding to green light (e.g., 510 nanometers), and the blue channel of the color sensor 305A may be associated with a wavelength corresponding to blue light (e.g., 475 nanometers). The clear channel may not be associated with a particular wavelength and may detect the intensity of light in general. Based on the intensity level readings for each of these channels/wavelengths, the color sensor 305A may extrapolate the color of detected light using the weighted values of each of these intensities.

Although the color sensor 305A is described as a single sensing device, in some embodiments the color sensor 305A may be micro-camera. For example, the color sensor 305A may be a micro-camera that is used in an optical mouse. The micro-camera may be designed with a two dimensional array of sensing elements that each provide light intensity values for multiple wavelengths/colors (e.g., red-green-blue). Accordingly, in this embodiment, the color sensor 305A may produce a two dimensional array of wavelength/color specific light intensity values. The use of a micro-camera provides a greater resolution for detected light. This greater resolution may be particularly useful in detecting objects (e.g., intersections along the line 105) as more data points may be available for analysis.

In contrast to the color sensor 305A, the light sensors 305B may be photoresistors or phototransistors that measure the intensity of light in a range of wavelengths with maximum gain at a specific wavelength. For example, a light sensor 305B may have a peak sensitivity at 630 nanometers and may be used in conjunction with a light emitting element 307 in this region of the light spectrum. When the robotic device 103 operates in a reflected light mode on a non-light emitting surface (e.g., a non-digital board 101), the line 105 and/or patterns 107 below the sensor 305B may be illuminated by the light emitting element 307. Light reflected off the line 105 and the patterns 107 from the light emitting element 307 may be collected by the sensor 305B at a high efficiency because of the wavelength match between the peak sensitivity of the sensor 305B and the wavelength of light emitted by the light emitting element 307.

The measurement/sensor data from the sensors 305 may be received by the processor 301 and/or an application running on the processor 301 for further processing (i.e., the optical sensing module 323). The sensors 305 may operate in the visible spectrum to detect visible light produced or reflected by the board 101.

As noted above, in some embodiments, the color sensor 305A and the light sensors 305B may also include a light emitting element 307 (e.g., a light emitting diode (LED)). The light emitting element 307 may be proximate to a corresponding sensor 305 and may be used while the robotic device 103 is operating on a non-digital board 101. For example, the robotic device 103 may detect an absence of light while operating on a non-digital board 101 (e.g., a piece of paper) and in response toggle the light emitting element 307 "ON" to illuminate an area proximate to the corresponding sensor 305. Light reflected off of this non-digital board 101 by each light emitting element 307 may thereafter be detected and analyzed by the sensors 305 to determine intensity of the reflected light. This sensor data may assist in guiding the device 103 along the line 105 and detecting color patterns 107 as will be described in greater detail below.

Figure 3B:
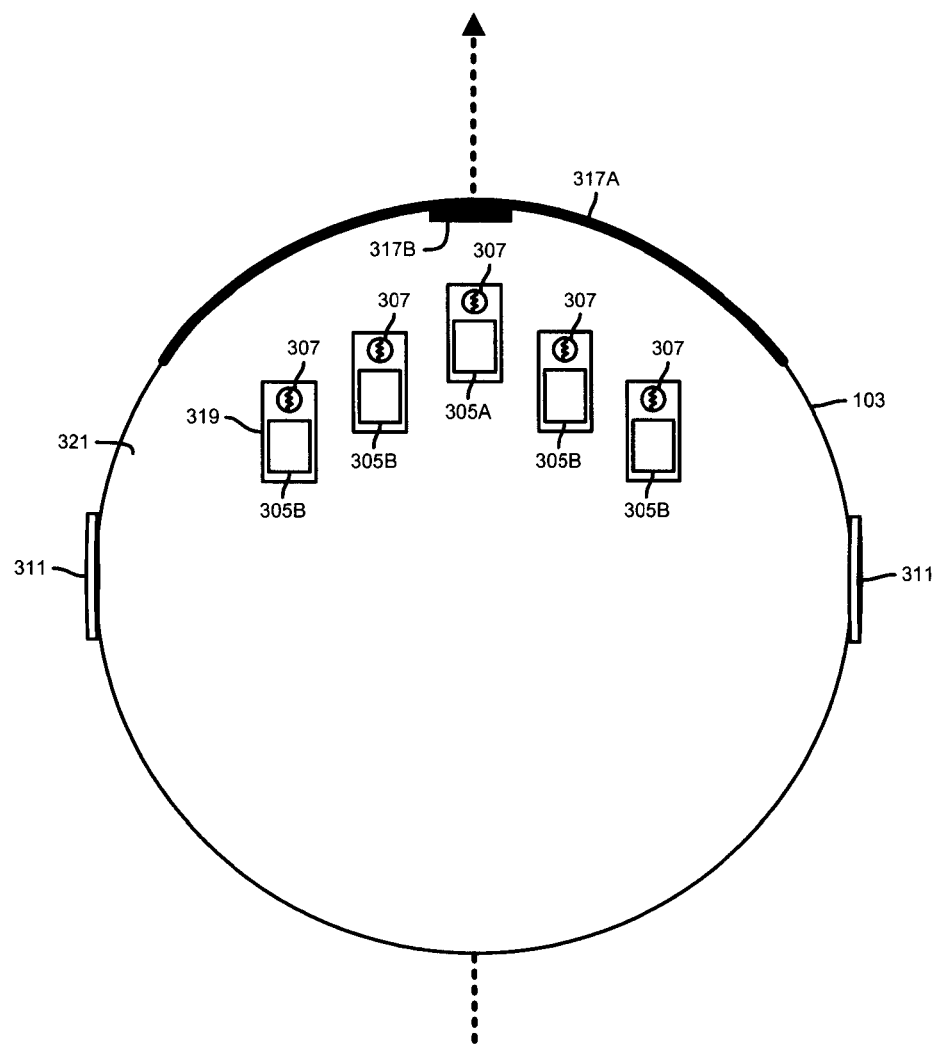
FIG. 3B shows a bottom surface of the robotic device with one color sensor and four light sensors arranged in a "V" formation according to one embodiment.

FIG. 3B shows a bottom surface 321 of the robotic device 103 according to one embodiment. As shown, the bottom surface 321 includes the sensors 305 and the light emitting elements 307 arranged in a "V" formation. The formation of the sensors 305 in this embodiment allows the sensors 305 to broadly cover the bottom surface 321 of the board 101, even while the robotic device 103 is making 90° turns. In one embodiment, the robotic device 103 moves such that the line 105 bisects the "V" formed by the sensors 305 and the robotic device 105 moves in the direction shown by the dashed line of FIG. 3B.

Figure 3C:
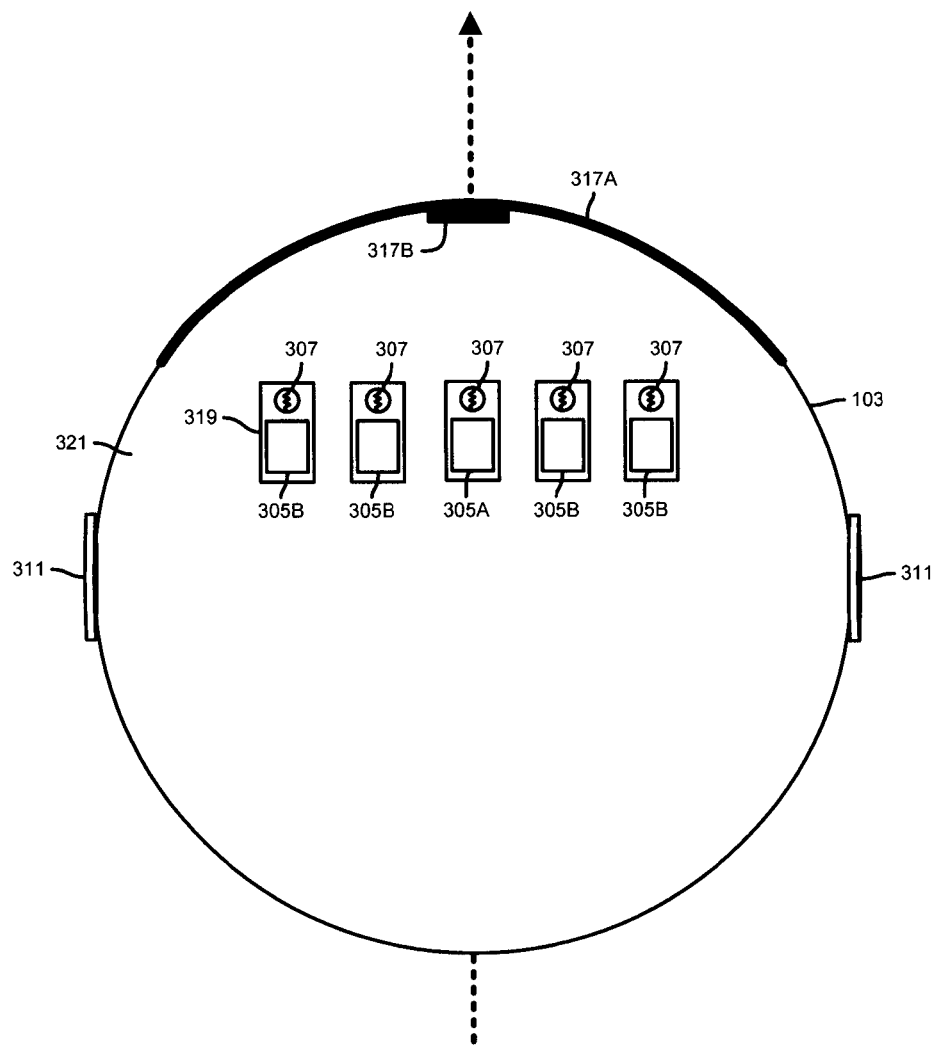
FIG. 3C shows a bottom surface of the robotic device with one color sensor and four light sensors arranged linearly according to one embodiment.
Figure 3D:
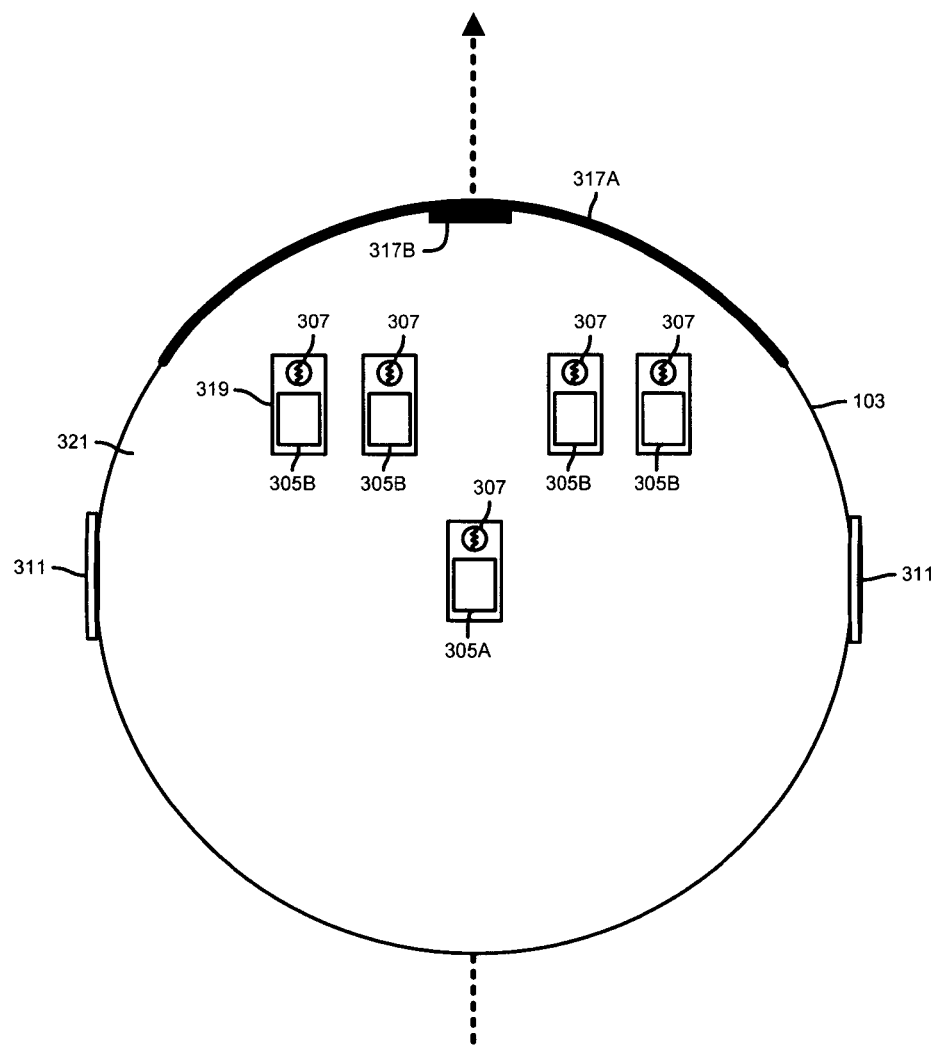
FIG. 3D shows a bottom surface of the robotic device with a color sensor located at the center of rotation of the robotic device according to one embodiment.

Although described and shown in FIG. 3B as being arranged in a "V" formation, in other embodiments the sensors 305 may be differently arranged. For example, as shown in FIG. 3C, the sensors 305 may be arranged linearly. In other embodiments, one or more of the sensors 305 may be arranged on a center point of rotation for the robotic device 103. For example, as shown in FIG. 3D, the color sensor 305A may be located at the center of the surface 321, which defines the center of rotation for the robotic device 103. Although shown as the array of light sensors 305B being separate from the centrally placed light sensor 305B, in other embodiments the array of light sensors 305B may be arranged in an array with the color sensor 305A (e.g., arranged linearly along with the color sensor 305A). By being placed at the center of rotation of the robotic device 103, the color sensor 305A may be better positioned to detect light intensity values while the robotic device 103 is turning. In particular, the color sensor 305A and/or other sensors 305 located proximate to the center of rotation for the robotic device 103 may be situated to remain on the line 105 or at the same position on the board 101 while the robotic device 103 is rotating. This consistent position during rotation may allow the sensors 305 to track/detect the line 105 or patterns 107 even while rotating/turning.

Figure 3E:
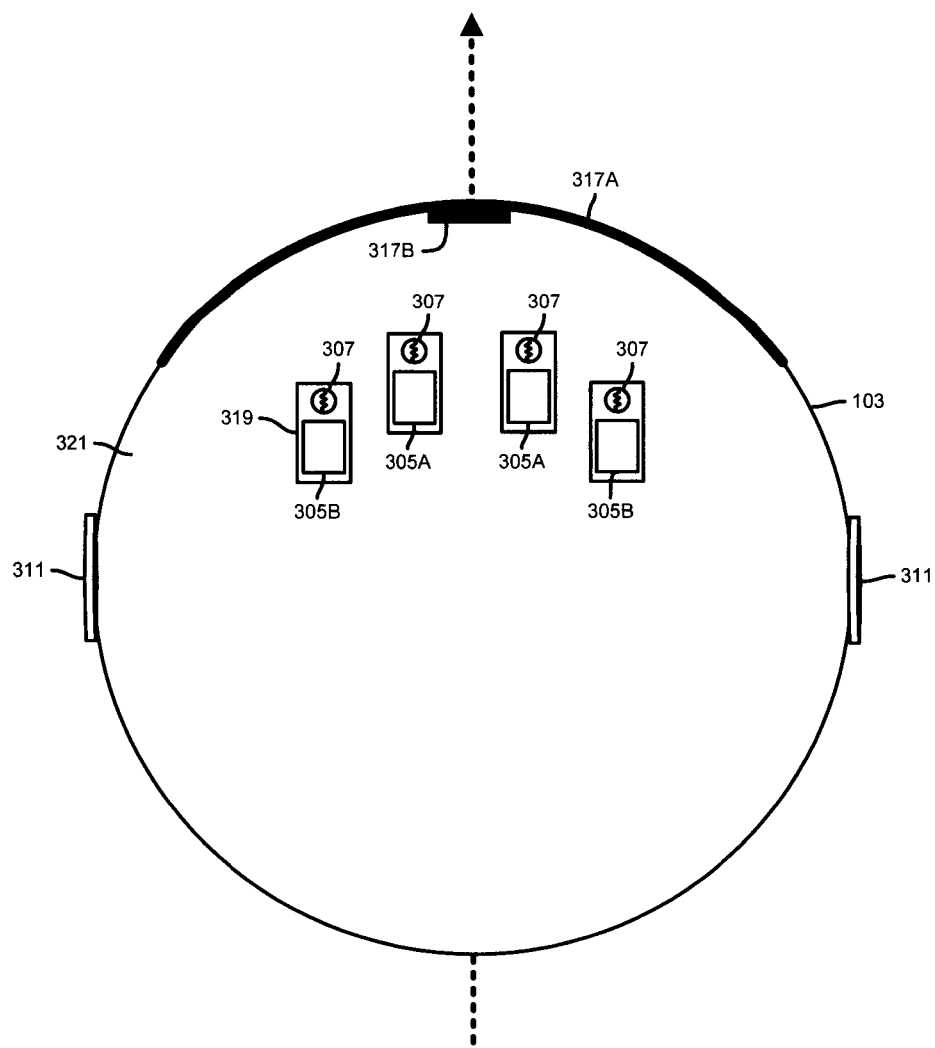
FIG. 3E shows a bottom surface of the robotic device with two color sensors and two light sensors according to one embodiment.

Although shown and described as including one color sensor 305A and four light sensors 305B, in other embodiments, a different number of sensors 305A and/or 305B may be used. For example, as shown in FIG. 3E, two color sensors 305A and two light sensors 305B may be used. In this embodiment, the robotic device 103 may move such that the dashed line shown in FIG. 3E bisects the set of color sensors 305A.

In some embodiments, the robotic device 103 may also include a set of light shields 317 that reduce the amount of ambient light detected by the sensors 305. For example, the shields 317A and 317B may extend below the surface 321 and partially shield ambient light from reaching the sensors 305. For example, the wheels 311 may provide a 1.0 millimeter clearance between the surface 321 and the board 101. In this example, the shields 317A and 317B may extend 0.5 millimeters beyond the surface 321 to reduce the clearance between the surface 321 and the board 101 to 0.5 millimeters. This reduction in clearance reduces the amount of ambient light that may reach the sensors 305 while still allowing the device 103 to move easily over the board 101 without undue friction caused by the shields 317 scraping the surface 321.

The sensors 305 may also be recessed in the openings 319 to further prevent ambient light from reaching the sensors 305 during operation. In some embodiments, a two-way linear polarizer film may be placed over the sensors 305. The polarizer film prevents ambient light from reaching the sensors 305 from the sides of the device 103 (e.g., restricts light from directions orthogonal to the direction of movement of the device 103 while allowing light parallel to the direction of movement). In other embodiments, other multi-way polarizer films may be used. For example, a four way polarizer film (e.g., two two-way linear films placed orthogonally to each other to form the four-way polarizer film) may restrict light from reaching the sensors 305 in four directions. Additional levels of polarizer films may be used to further prevent all off-axis light (e.g., a circular polarizer film may be used to exclude all light that is not emitted/reflected directly from the board 101 and/or perpendicular to the surface 321). This ambient light prevention, using both shields 317A and 317B and polarizer film, assists in producing accurate sensor data that focuses on 1) light emitted by the board 101 or 2) light emitted by the light emitting elements 307 and reflected by the board 101. In particular, the shields 317A and 317B and polarizer film restrict ambient light from reflecting off of the board 101, being detected by the sensors 305 and skewing intensity values produced by the sensors 305. Accordingly, the robotic device 103 may improve performance in bright light conditions by shielding ambient light as described above.

As shown in FIG. 3A and mentioned above, the robotic device 103 may also include an electro-mechanical mechanism 309 to propel the robotic device 103 across the board 101. The electro-mechanical mechanism 309 may include one or more electric motors 313 and one or more drivers 315. In this embodiment, the drivers 315 may be controlled by the processor 301 and/or an application running on the processor 301 to apply voltages to corresponding motors 313. The motors 313 may in-turn move the wheels 311 to propel the robotic device 103 at a desired speed and in a desired direction. For example, a higher voltage may be applied to a motor 313 controlling a left wheel 311 in comparison to a voltage applied to a motor 313 controlling a right wheel 311 to cause the robotic device 103 to turn left, while a higher voltage may be applied to a motor 313 controlling a right wheel 311 in comparison to a voltage applied to a motor 313 controlling a left wheel 311 to cause the robotic device 103 to turn right. In some embodiments, pulse-width modulation (PWM) may be used by the drivers 315 for controlling the motors 313. The decision on how to drive the one or more electrical motors 313 may be based on data received from the sensors 305 such that the robotic device 103 follows the line 105 and/or performs the functions corresponding to detected color patterns 107 as will be described in greater detail below.

In some embodiments, the robotic device 103 may include one or more input mechanisms 325. For example, the input mechanisms 325 may include a keyboard, a mouse, or a port (e.g., a universal serial bus (USB) port) for receiving data from another device (e.g., the board 101). In some embodiments, these input mechanisms 325 may include one or more of the sensors 305. Further, the input mechanisms 325 may include other types of sensors, including thermometers, accelerometers, and microphones.

In one embodiment, the robotic device 103 may include a light controller 327 and set of lights 329. For example, the lights 329 may be light emitting diodes (LEDs) that are controlled by the light controller 327 to flash using different colors and intensities.

Figure 4:
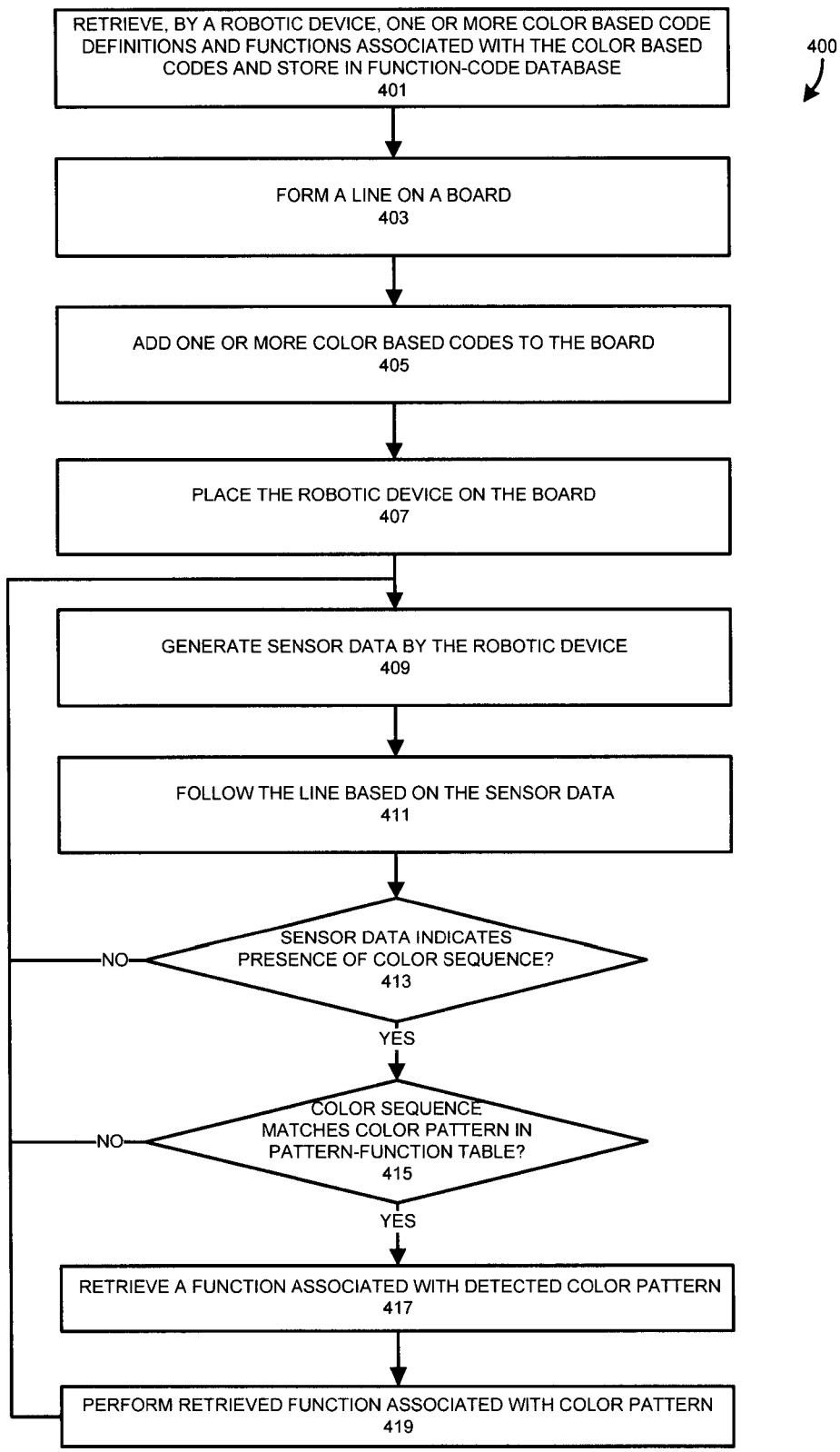
FIG. 4 shows a method for operating the robotic device to follow a line while performing functions corresponding to detected color patterns according to one embodiment.
Figure 5:
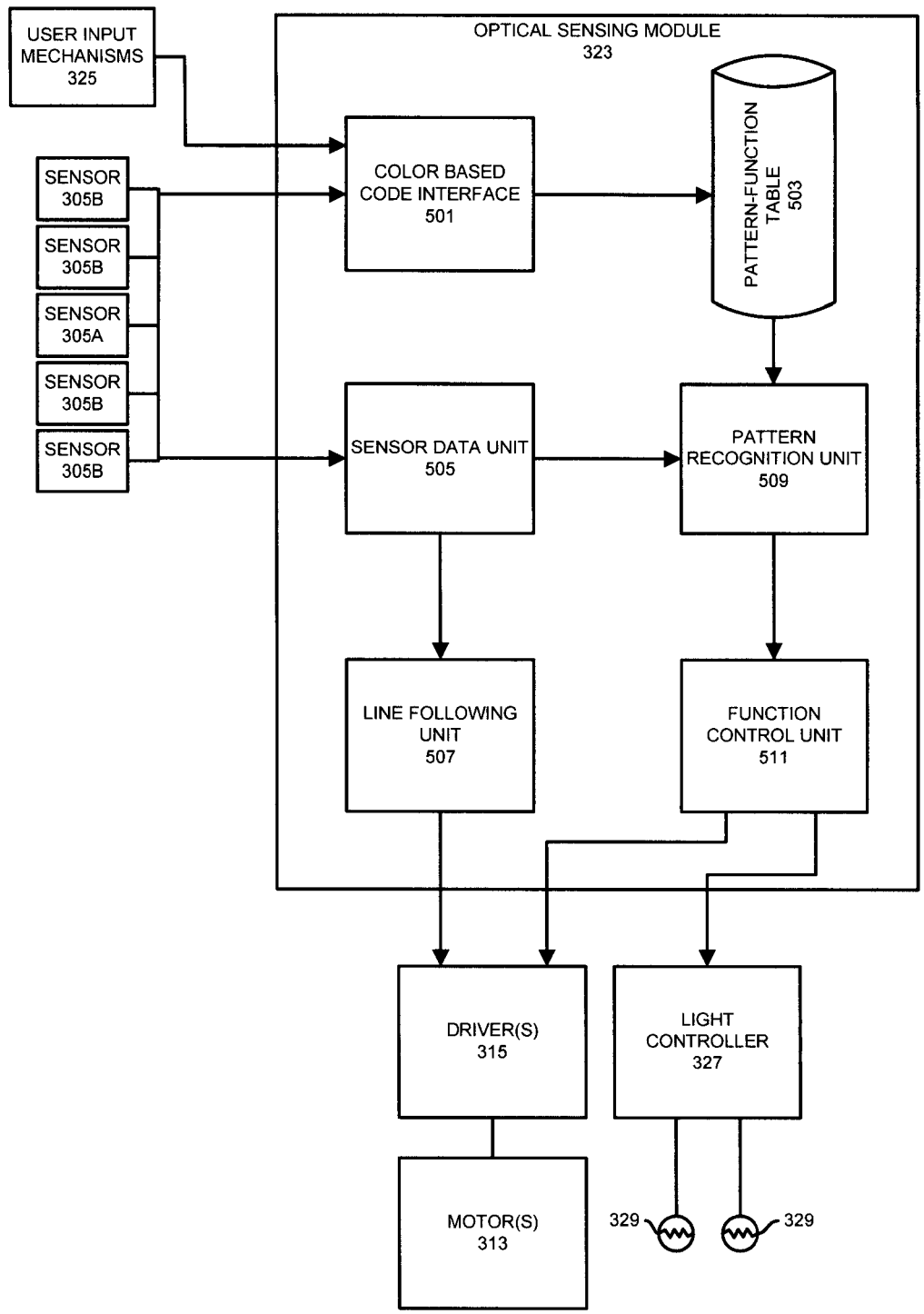
FIG. 5 shows an example component diagram of the elements in an optical sensing module of the robotic device according to one embodiment.

Turning now to FIG. 4, a method 400 for operating the robotic device 103 to autonomously follow the line 105 while performing functions corresponding to detected color patterns 107 will be described. Each operation of the method 400 may be performed by one or more of the robotic device 103 and the board 101. For example, as noted above, the board 101 may include a line design application 207 and the robotic device 103 may include an optical sensing module 323. Each operation of the method 400 may be performed by one or more elements of the line design application 207 and/or the optical sensing module 323. For example, FIG. 5 shows an example component diagram of the elements in the optical sensing module 323, which may be used to perform the various operations of the method 400. In other embodiments, the optical sensing module 323 may include more or less components than those shown and described herein.

As shown in FIG. 2, the line design application 207 may be stored in the memory unit 203 and run/executed by the main system processor 201. Similarly, as shown in FIG. 3A, the optical sensing module 323 may be stored in the memory unit 303 and run/executed by the main system processor 301. Though shown as operating from the memory units 203 and 303, in other embodiments, the line design application 207 and the optical sensing module 323 may operate using one or more digital or analog filters and circuits implemented within the board 101 and the robotic device 103, respectively. Accordingly, the line design application 207 and the optical sensing module 323 are not restricted to software executed by the main system processors 201 and 301, but instead may also be implemented as a set of hardware circuitry imbedded in the board 101 or the robotic device 103.

Although shown and described in a particular order, in some embodiments the operations of the method 400 may be performed in a different order. For example, in some embodiments, two or more operations of the method 400 may be performed concurrently or in partially overlapping time periods.

The method 400 may commence at operation 401 with the retrieval of one or more color pattern 107 definitions and corresponding functions. The color patterns 107 are segments/sequences of colors that may be shown on the board 101. Using the sensors 305, in particular the color sensor 305A, the robotic device 103 may collect sensor data while traversing the line 105 and compare this sensor data against the retrieved color pattern 107 definitions. As will be described in greater detail below, upon matching the sensor data to a color pattern 107 definition retrieved at operation 401, a function corresponding to the detected color pattern 107 definition may be performed by the robotic device 103.

A color pattern 107 may be a series of colors shown in a static representation or in a dynamic representation. For example, a static color pattern 107A may be defined by a set of colors or colored shapes arranged linearly. The colors represented in a color pattern 107 may be the primary colors (e.g., red, green, and blue), a mixture of the primary colors (i.e., additive combinations of the primary colors), grayscale colors, or colors from any other palette. The shapes in which the colors of a pattern 107 are represented may include circles, two-dimensional capsules, rectangles, squares, diamonds, line segments, or any other similar shape. The shapes may be designed to substantially cover an area of the line 105 upon which the color pattern 107 is covering. In some embodiments, the colors of a color pattern 107 may not be represented in a well defined shape, but instead represented as a scribble or quick drawing on the board 101.

Figure 6A:
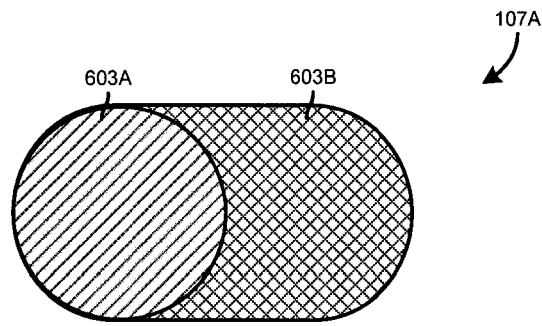
FIG. 6A shows an example static color pattern with two round shape sections according to one embodiment.

FIG. 6A shows a static color pattern 107A according to one embodiment. As shown, the color pattern 107A includes a first section 603A and a second section 603B. The first section 603A may be formed by a circle shape while the second section 603B may be formed by the remaining area of a two-dimensional capsule shape after the circle shape is placed to cover an end of the capsule shape. In this example, the first section 603A is a first color and the second section 603B is a second color, which is different than the first color. Accordingly, the definition of the color pattern 107A shown in FIG. 6A may indicate the first color followed by the second color. This color difference is denoted in FIG. 6A and throughout using shading.

Figure 6B:
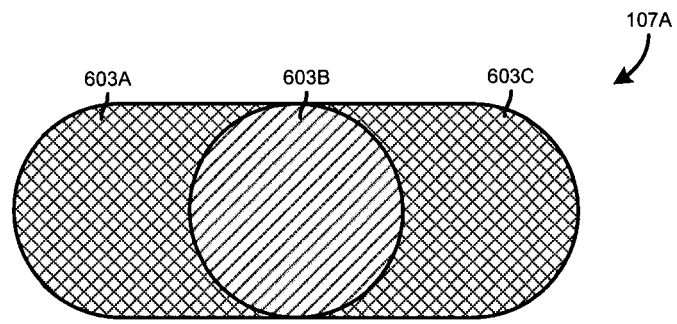
FIG. 6B shows an example static color pattern with three round shape sections according to one embodiment.

Although the static color pattern 107A shown in FIG. 6A includes two sections 603A and 603B, in other embodiments, static color patterns 107A may have more than two sections 603. For example, FIG. 6B shows a static color pattern 107A according to another embodiment. As shown, the color pattern 107A includes a first section 603A, a second section 603B, and a third section 603C. The second section 603B may be formed by a circle shape while the first and third sections 603A and 603C may be formed by the bisection of a two-dimensional capsule shape by the circle shape (i.e., the circle shape may be placed in the middle of the capsule shape such that the first and third sections 603A and 603C share identical surface areas and dimensions but rotated 180°). In this example, the first and third sections 603A and 603C may be a first color while the second section 603B may be a second color that is different from the first color of the first and second sections 603A and 603C. Accordingly, the definition of the color pattern 107A shown in FIG. 6B may indicate the first color followed by the second color and again followed by the first color.

Figure 6C:
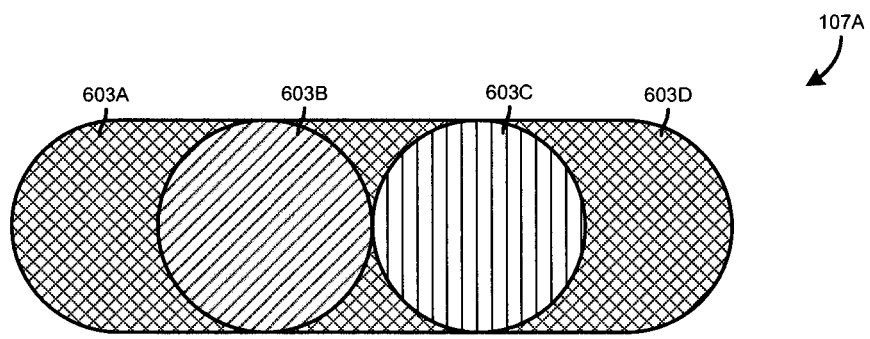
FIG. 6C shows an example static color pattern with four round shape sections according to one embodiment.

FIG. 6C shows a static color pattern 107A according to another embodiment. As shown, the color pattern 107A includes a first section 603A, a second section 603B, a third section 603C, and a fourth section 603D. The second section 603B and the third section 603C may be formed by respective circle shapes while the first and fourth sections 603A and 603D may be formed by the bisection of a two-dimensional capsule shape by the circle shapes (i.e., the circle shapes may be placed in the middle of the capsule shape such that the first and fourth sections 603A and 603D share identical surface areas and dimensions but rotated 180°). In this example, the first and fourth sections 603A and 603D may be a first color, the second section 603B may be a second color, and the third section 603C may be a third color. The first, second, and third colors in the pattern 107A shown in FIG. 6C may all be different. The definition of the color pattern 107A shown in FIG. 6C may indicate the color sequence (first color, second color, third color, first color).

Figure 6D:
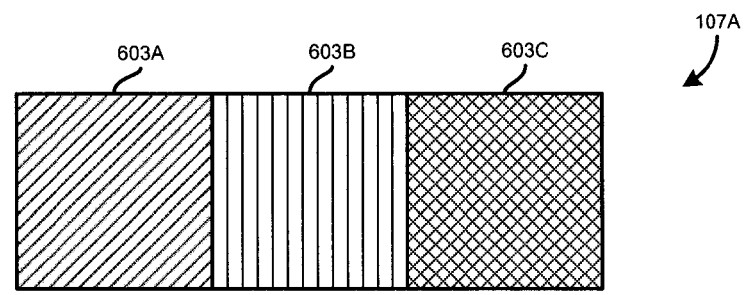
FIG. 6D shows an example static color pattern with three square sections according to one embodiment.
Figure 6E:
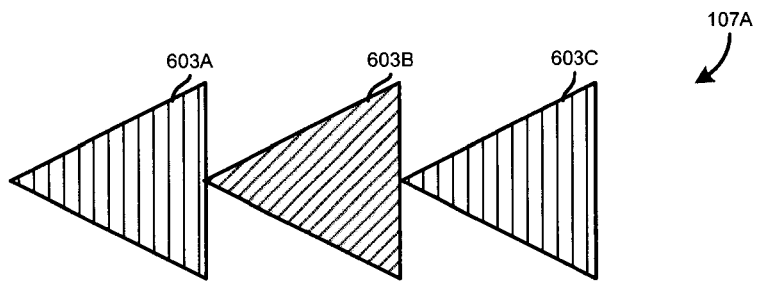
FIG. 6E shows an example static color pattern with three triangle sections according to one embodiment.
Figure 6F:
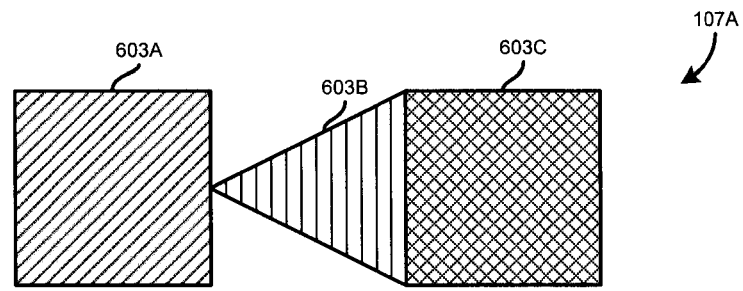
FIG. 6F shows an example static color pattern with a combination of two square sections and one triangle section according to one embodiment.

Although described in relation to circles and capsules, as noted above, other shapes may be used for color patterns 107. For example, as shown in FIGS. 6D, 6D, and 6F, colored square and triangle shapes may be used alone or in combination to represent color patterns 107A.

Although described in relation to colored shapes, the color pattern 107A definitions may not include any shape data and the shapes described herein may be simply used to designate separate sections 603 of the patterns 107. Therefore, the patterns 107 are defined by the different order of colors rather than the shapes that these sections 603 are represented within. However, in other embodiments, shape data may be included in the pattern 107 definitions.

Additionally, although described in relation to multiple colored sections 603, in some embodiments static based patterns 107A may be defined based on a single color section 603. In this embodiment, the single static color pattern 107A may be detected while traversing the line 105 or generally moving about the board 101.

In some embodiments, each of the static based patterns 107A may be symmetric about one or more axes such that the colors are in the same order regardless of the direction by which the pattern is read/detected along these axes (e.g., the same sequence/order of colors is detected regardless of the direction of movement of the robotic device 103 along the line 105). In other embodiments in which one or more of the static color patterns 107A are asymmetric, each order of color sequences may correspond to a separate definition and associated function. For example, the detected color sequence red, blue, and green may correspond to a first function to be performed by the robotic device 103, while the color sequence green, blue, and red may correspond to a second function to be performed by the robotic device 103. In this embodiment, the first function and the second function may be the same or distinct.

In one embodiment, the size/dimensions of each section 603 of the color patterns 107 may be determined based on the placement of the sensors 305 on the robotic device 103, the dimensions of the sensors 305 on the robotic device 103, the potential top speed of the robotic device 103, and/or the dimensions of the line 105. By taking these factors into consideration when sizing the sections 603 of the color patterns 107, the system 100 ensures that the sensors 305 may be able to take an adequate number of readings to ensure that a proper color/intensity reading is captured. For example, each section 603 of patterns 107 may be between 3 millimeters and 10 millimeters in length and width, the device 103 may be capable of moving at 7.5 centimeters/second (3.0 inches/second), and the sensors 305 may operate at 150 Hz. In this example, the size of the sections 603 may allow the sensors 305 to take a sufficient amount of readings such that the optical sensing module 323 may confidentially determine the color of each section 603.

Figure 7A:
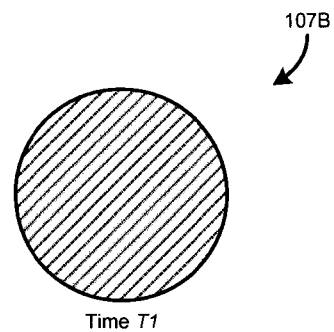
FIG. 7A shows an example dynamic color pattern at a first point in time according to one embodiment.
Figure 7B:
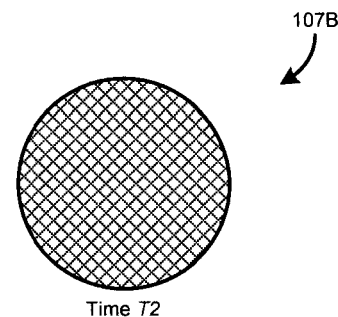
FIG. 7B shows the example dynamic color pattern at a second point in time according to one embodiment.
Figure 7C:
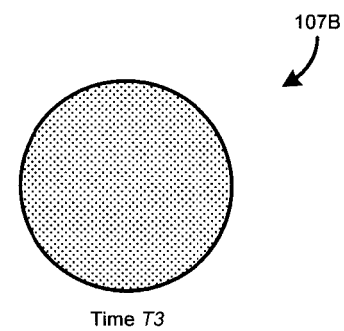
FIG. 7C shows the example dynamic color pattern at a third point in time according to one embodiment.

As noted above, the retrieval of one or more color pattern 107 definitions at operation 401 may include the retrieval of dynamic color pattern 107B definitions. Dynamic color patterns 107B may be defined by one or more shapes that change color in a sequence over time. For example, FIG. 7A shows a dynamic color pattern 107B according to one embodiment at time T1. As shown, the color pattern 107B is shown using a circle shape; however, in other embodiments the dynamic pattern 107B may be shown using any other shape. Accordingly, the dynamic pattern 107B includes a single section 603 for displaying colors. At time T1 the dynamic color pattern 107B may be a first color as denoted by the cross shading of the circle shape in FIG. 7A. In contrast, FIG. 7B shows the color pattern 107B at time T2. At time T2, the color pattern 107 is a second color, which is different from the first color, as denoted by the different shading of the circle shape in comparison to FIG. 7A. FIG. 7C shows the color pattern 107B at time T3. At time T3, the color pattern 107B is a third color, which is different from the first and second colors, as denoted by the different shading of the circle shape in comparison to FIG. 7A and FIG. 7B. In these embodiments, the time difference between T1 and T2 and T2 and T3 may be different or identical. For example, in one embodiment, the difference between T1 and T2 may be 3.0 milliseconds and the difference between T2 and T3 may be 3.0 milliseconds. In one embodiment, the time difference between color changes (i.e., different between T1 and T2 and T2 and T3) may be set based on the capabilities of the sensors 305 of the robotic device 103 and/or the top speed of the robotic device 103. For example, the time difference between color changes of the dynamic color pattern 107B may be set such that the sensors 305 may have adequate time when moving at a top speed of the robotic device 103 to take a sufficient number of color/light intensity readings to confidently determine the color during each time interval.

In some embodiments, the color pattern 107B definitions may be based on both the different colors in the sequence of flashing/pulsating colors as well as the time difference between colors in the sequence. Accordingly, in this embodiment using the example provided above, the time difference between T1 and T2 and T2 and T3 may be different.

Although described in relation to a set of three colors, in other embodiments, the dynamic color pattern 107B may be defined by any series of two or more colors that pulsate in a particular sequence over time. For example, a sequence of four color changes may define a dynamic color pattern 107B. In some embodiments colors may be shared between non-sequential color changes. For example, a dynamic color pattern 107B may be defined by the color sequence red, blue, red, and green.

As described, the dynamic color patterns 107B may be shown on a digital board 101 as a series of flashing colors at a point on board 101. In some embodiments, the dynamic color patterns 107B may display the corresponding sequence of colors (e.g., the first, second, and third colors in the example of FIGS. 7A-7C) a single time or a predefined number of times. In other embodiments, the sequence of colors may repeat continuously. Accordingly, the dynamic color pattern 107B may be defined by a cyclic switching between colors during a discrete or unbounded time period.

As noted above, the color patterns 107 may utilize either primary colors or grayscale shading/colors. In either case, the color sensor 305A may be utilized to determine the color of each section 603 of a color pattern 107. In some embodiments, the light sensors 305B may also be utilized to either determine the color of a section 603 of a pattern 107 or to verify the color determination made by the color sensor 305A. For example, a light sensor 305B may determine a light intensity value based on light reflected from a section 603 of a color pattern 107 or light emitted by a section 603 of a color pattern 107. Since darker colors absorb more light than lighter colors, the intensity values of reflected light may be different based on color differences. Based solely on this intensity value, the color of the section 603 may be determined and this determination may be compared against a separate color determination made by the color sensor 305A to verify the accuracy of the color sensor 305A. Use of the light sensors 305A in this fashion may be particularly useful with grayscale colors, where light sensors 305B may be particularly capable of determining differences between colors.

As noted above, each of the color patterns 107 (e.g., either static 107A or dynamic 107B) may be associated with a function. The number of different colors available (i.e., colors capable of being detected/distinguished by the sensors 305) and the length of the color sequences may define the number of unique patterns offered by the system 100 and the number of corresponding unique functions that may be assigned to patterns 107. These functions may define actions for the robotic device 103 to perform while traversing the line 105 and may be communicated to the robotic device 103 along with the color pattern 107 definitions at operation 401.

In one embodiment, the functions may include changing the speed at which the robotic device 103 traverses the line 105. For example, the change of speed may be an increase of speed or a decrease of speed, including stopping the device 103. The change of speed may be for an indefinite time period, for a prescribed time period (e.g., ten seconds), or until a predefined item (e.g., an intersection) or pattern 107 is detected. For example, a function may indicate that the robotic device 103 pauses for three seconds.

In one embodiment, the functions may include rotating the device 103 by a prescribed degree. For example, the robotic device 103 may be rotated 180° (i.e., a U-turn), 360°, or 720°. In one embodiment, a rotation function may cause the device 103 to rotate after a predefined delay or upon detection of a predefined item (e.g., an intersection) or another pattern 107. Accordingly, the robotic device 103 may first detect the color pattern 107 that is associated with a rotation operation and thereafter rotate only after encountering/detecting a predefined item.

In one embodiment, the functions may include causing lights 329 on the robotic device 103 to flash in a prescribed sequence. For example, the lights 329 may flash colors representing the colors represented in the detected color pattern 107.

In one embodiment, the functions may include altering the way in which the robotic device 103 handles an intersection in the line 105. For example, when approaching a decision between proceeding left or right, a function corresponding to a previously detected pattern 107 may indicate that the robotic device 103 turns left. In some embodiments, the function may provide different scenarios based on three-way intersections (e.g., "T" in the line 105) or four-way intersections (e.g., "+" in the line 105). For example, a function may indicate that the robotic device 103 turns left upon arriving at a three-way intersection but proceeds straight upon arriving at a four-way intersection. In one embodiment, this intersection function may continue indefinitely, continue for a predefined time period (e.g., 5 seconds), or for a predefined number of intersections.

In one embodiment, the functions may include causing the robotic device 103 to jump the line 105. In particular, a jump function may cause the robotic device 103 to travel off of the line 105 in a prescribed direction for a predefined time period or until the line 105 is detected again, at which point the robotic device 104 again follows the line 105.

In one embodiment, the functions may include causing the robotic device 103 to perform a zigzag movement. For example, a zigzag function may cause the robotic device 103 to move in several short segments with variable angles between each segment. Zigzag movements may be performed for a predefined time period or until a predefined object is detected (e.g., the line 105 or another pattern 107). For example, following performance of a zigzag movement, the robotic device 103 may attempt to locate and follow the line 105.

In one embodiment, the functions may include a counter function that counts the number of instances a predefined pattern 107 or an object (e.g., intersections) is detected. Upon reaching a threshold value for the counter, a movement or other change (similar to those described above) is performed. For example, a counter function may cause the robotic device 103 to speed up after five four-way intersections are detected.

In one embodiment, the functions may include turning a communications system of the robotic device 103 on or off. For example, a function may cause the robotic device 103 to initiate a communications system, establish a connection, and/or communicate with another robotic device 103, the board 101, or another device (e.g., a remote server). The communications may be performed using a radio-frequency interface/radio of the device 103 and one or more protocols/standards (e.g., IEEE 802.11 suite of standards, IEEE 802.3, cellular Global System for Mobile Communications (GSM) standards, cellular Code Division Multiple Access (CDMA) standards, Long Term Evolution (LTE) standards, and/or Bluetooth standards) while in other embodiments a set of simulated capacitive touches may be used for communicating information to a touch equipped device. In one embodiment, the robotic device 103 may communicate location, orientation, battery level, motor 313 speed, motor 313 voltage, data from the color sensor 305A, data from the light sensors 305B, data from any other sensors integrated within the device 103 (e.g., a microphone, a thermometer, and an accelerometer), and/or data from an accessory attached or otherwise coupled to the device 103.

In one embodiment, the functions may include causing the robotic device 103 to emit sounds. For example, the robotic device 103 may include a speaker and upon triggering a sound playback function, the robotic device 103 may emit a set of sounds through the speaker.

In one embodiment, the functions may include causing the robotic device 103 to record sounds proximate to the device 103. For example, the robotic device 103 may include a microphone and upon triggering a sound recording function, the robotic device 103 may record sounds using the integrated microphone.

In one embodiment, the functions may include causing the robotic device to trigger an accessory of the robotic device 103. For example, the robotic device 103 may be capable of being coupled to one or more accessories. Upon triggering an accessory function, the robotic device 103 may trigger the accessory to perform a predefined operation.

The above set of functions is purely used for illustrative purposes and in other embodiments more/different functions may be included/associated with respective color patterns 107. In some embodiments, combinations of the above functions may be assigned to a single color pattern 107 definition.

As noted above, the color pattern 107 definitions and associated functions may be received at operation 401. This receipt of color pattern 107 definitions and functions may be through sensors 305 or other input mechanisms 325 of the robotic device 103. For example, the input mechanisms 325 may include a data port. This data port on the robotic device 103 may be used for transferring data defining the color patterns 107 and associated functions to the robotic device 103 at operation 401.

The color pattern 107 definitions and associated functions may be retrieved at operation 401 by the color pattern interface 501 and stored in the pattern-function table 503. As will be described in greater detail below, the pattern-function table 503 may be periodically queried to determine 1) a corresponding color pattern 107 that matches measured sensor data and 2) a function corresponding to the detected/matched color pattern 107. These functions may thereafter be used for controlling the robotic device 103.

At operation 403, a line 105 may be drawn or otherwise formed on the board 101. The line 105 may form a pathway that will be followed/traversed by the robotic device 103. The line 105 may be created using any technique or input mechanism. For example, when using a non-digital board 101 (e.g., a piece of paper), the line 105 may be formed using a marker or pen. When using a digital board 101 (e.g., a tablet computer), the line 105 may be formed using one or more input mechanism 209 (e.g., a touch display panel, a mouse, a keyboard, a gaming pad/controller, etc.). The width of the line 105 may be selected based on the dimensions of the robotic device 103 and/or the layout of the sensors 305 on the robotic device 103. For example, the width of the line 105 may be selected such that when the line 105 bisects the set of sensors 305 (i.e., along the dashed line in FIG. 3B), at least one sensor 305 is positioned to extend beyond the width of each side of the line 105. Accordingly, a sensor 305 may always be located on each side of the line 105 to ensure proper tracking of the line 105 and potentially patterns 107 located off of the line 105.

The color of the line 105 may be selected to be different from any color used for color patterns 107. For example, the line 105 may be black, while none of the color pattern 107 definitions received at operation 401 may include the color black.

Figure 8:
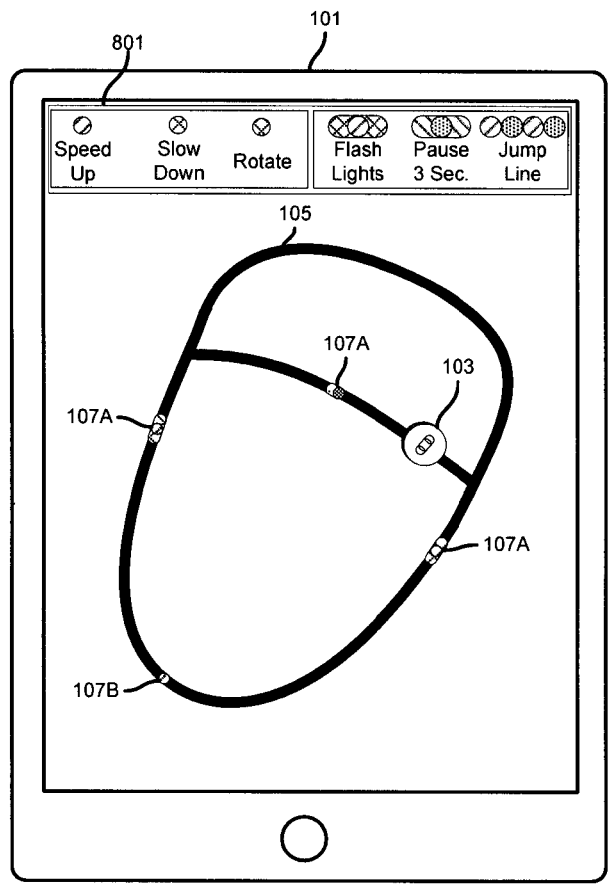
FIG. 8 shows an interface provided by a line design application of the board for generating a line and adding one or more color patterns to the line according to one embodiment.

At operation 405, one or more color patterns 107 may be placed on the board 101. In particular, the color patterns 107 may be placed along the line 105 or proximate to the line 105. The color patterns 107 may be added to the board 101 using any technique or input mechanism. For example, when using a non-digital board 101 (e.g., a piece of paper), color patterns 107 may be added to the board 101 using different colored markers, pencils, or pens. When using a digital board 101 (e.g., a tablet computer), the color patterns 107 may be formed using one or more input mechanism 209 (e.g., a touch display panel, a mouse, a keyboard, a gaming pad/control, etc.). For example, predefined color patterns 107 may be included in a graphical interface provided by the line design application 207. FIG. 8 shows an interface provided by the line design application 207 according to one embodiment. As shown, color patterns 107 may be shown in a toolbox 801. A user may drag or otherwise select color patterns 107 from the toolbox 801 and place them on the line 105 or proximate to the line 105. As noted above, the color patterns 107 may include static patterns 107A and dynamic patterns 107B. Both styles of patterns 107 may be provided in the toolbox 801 for selection by a user.

Although described above using template patterns 107 provided in the toolbox 801, in some embodiments the patterns 107 may be freely drawn on a board 101. For example, a user may draw colored circles/dots on the board 101 using a finger and a touch panel of the board 101.

Figure 9:
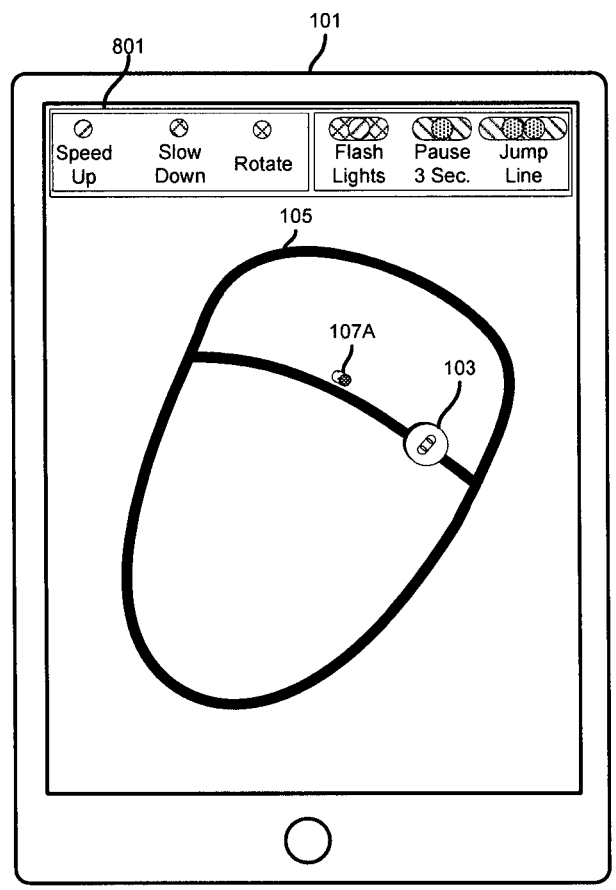
FIG. 9 shows an interface provided by the line design application of the board for generating a line and adding a color pattern near the line according to one embodiment.

As noted above, the color patterns 107 may be placed on the line 105. In some embodiments; however, the color patterns 107 may also be placed adjacent to the line 105. For example, as shown in FIG. 9, a static color pattern 107A may be placed off the line 105, but proximate to the line 105. As described above, since the width of the line 105 is selected such that the sensors 305 of the robotic device 103 extend over the line 105, the robotic device 103 may detect color patterns 107 that are not on the line 105. In these embodiments, the color patterns 107 detected off of the line 105 may be treated in the same fashion as color patterns 107 detected on the line 105 (i.e., performance of the same function). However, in other embodiments, color patterns 107 detected off of the line 105 may be treated differently than their on line 105 counterparts. In particular, the color pattern 107 definitions retrieved at operation 401 may include separate definitions and functions for patterns 107 detected on the line 105 and patterns 107 detected off the line 105.

In some embodiments, patterns 107 may be further distinguished based on their location off the line 105. For example, a pattern 107 detected on the left side of the line 105 may be associated with a separate function in comparison to the same pattern 107 detected on the right side of the line 105. Further, patterns 107 may be simultaneously detected on both sides of the line 105. In this embodiment, each pattern 107 may be treated individually with separate associated functions or treated as a combined pattern 107 associated with a single function. This flexibility with the detection of patterns 107 may provide a large amount of extensibility for pattern 107 definitions.

Patterns 107 that are off the line 105 may be touching the line 105 or within a predefined distance from the line 105. For example, the color patterns 107 may be between 1.0 millimeters and 5.0 millimeters from the line 105.

Following creation of the line 105 and addition of one or more color patterns 107 to the board 101, operation 407 may be performed. At operation 407, the robotic device 103 may be placed on the board 101 such that sensors 305 of the robotic device 103 are facing downwards onto the board 101. In particular, the robotic device 103 may be placed on the line 105 shown on the board 101. In this position, the sensors 305 of the robotic device 103 may generate sensor data corresponding to light intensity and color data (i.e., light intensity at particular wavelengths) for use in traversing the line 105 and detecting color patterns 107.

At operation 409, the robotic device 103 may generate sensor data using the sensors 305. For example, as noted above, the color sensor 305A may measure the intensity of detected light at particular wavelengths while the light sensors 305B may measure the intensity of light in a range of wavelengths. The detected light may be from light emitted by the board 101 (e.g., a digital board 101 such as a tablet computer) or from light reflected off of the board 101 (e.g., light emitted by the light emitting elements 307 and reflected off a surface of a non-digital board 101 such as a piece of paper). Sensor data from each one of these sensors 305 may be continually retrieved for analysis as the robotic device 103 moves across the board 101. For example, the sensors 305 may operate at 150 Hz to retrieve sensor data. In one embodiment, sensor data may be retrieved and/or recorded at operation 409 by the sensor data unit 505.

At operation 411, the robotic device 103 may follow the line 105 using the retrieved sensor data. In this embodiment, light intensity levels/color data from each of the sensors 305A and/or 305B may be utilized to ensure that the robotic device 103 is moving along the line 105. In particular, based on the continually retrieved sensor data, the robotic device 103 may steer left or right by applying varied currents with different voltage levels to corresponding motors 313 such that the robotic device 103 follows the line 105. In one embodiment, the line following unit 507 may analyze the sensor data and direct appropriate drivers 315 to apply specified voltages to the motors 313 at operation 411 such that the line 105 is followed.

At operation 413, the sensor data continually retrieved at operation 409 may be analyzed to determine the presence of one or more color sequences. In one embodiment, the pattern recognition unit 509 may obtain sensor data from the sensor data unit 505 and analyze the data for the presence of a color sequence at operation 413. In particular, the color sensor 305A may generate color data over a specified time period (e.g., 200 milliseconds). This color data may indicate changes in color of detected light during the time period. For example, color sensor data may indicate a change from black to red, from red to green, and from green to black (e.g., black, red, green, and black). In one embodiment, since the line 105 is known to be black, operation 413 may determine the presence of the color sequence red and green as the presence of black in the color sensor data is representative of the line 105.

Although described as using color sensor data, as noted above, light intensity level data from the light sensors 305B may also be used at operation 413 to determine color sequences. In particular, this light intensity data may be particularly useful for detecting grayscale colors and/or confirming the accuracy of color sensor data from the color sensor 305A.

After failing to detect a color sequence, the method 400 may return to operation 409 to continue to retrieve sensor data while the robotic device 103 is moving across the board 101. In contrast, upon detecting a color sequence at operation 413, operation 415 may query the pattern-function table 503 using the detected color sequence to determine if the color sequence corresponds to a color pattern 107 definition. Upon the color sequence failing to match a color pattern 107 definition, the method 400 may return to operation 409 to continue retrieving sensor data.

Upon the detected color sequence matching a color pattern 107 definition, operation 417 may retrieve a function corresponding to the matching color pattern 107 definition. The pattern recognition unit 509 may query the pattern-function table 503 with the detected color pattern 107 and retrieve an associated function at operation 415. As noted above in relation to operation 401, the pattern-function table 503 may include color pattern 107 definitions and associated functions for each pattern 107 definition. The functions may include different movement patterns for the robotic device 103 as described above. The function retrieved at operation 417 may thereafter be performed at operation 419 using the function control unit 511. In this embodiment, the function control unit 511 may adjust driver 315 settings for the motors 313 or light controller 327 settings for the lights 329.

Upon performance of the function at operation 419, the method 400 may return to operation 409 to continue to retrieve sensor data while the robotic device 103 is moving across the board 101. The method 400 may therefore continue indefinitely until an end condition has been reached (e.g., the end of the line 105 and/or a pattern 107 and corresponding function that stops the robotic device 105).

Figure 10:
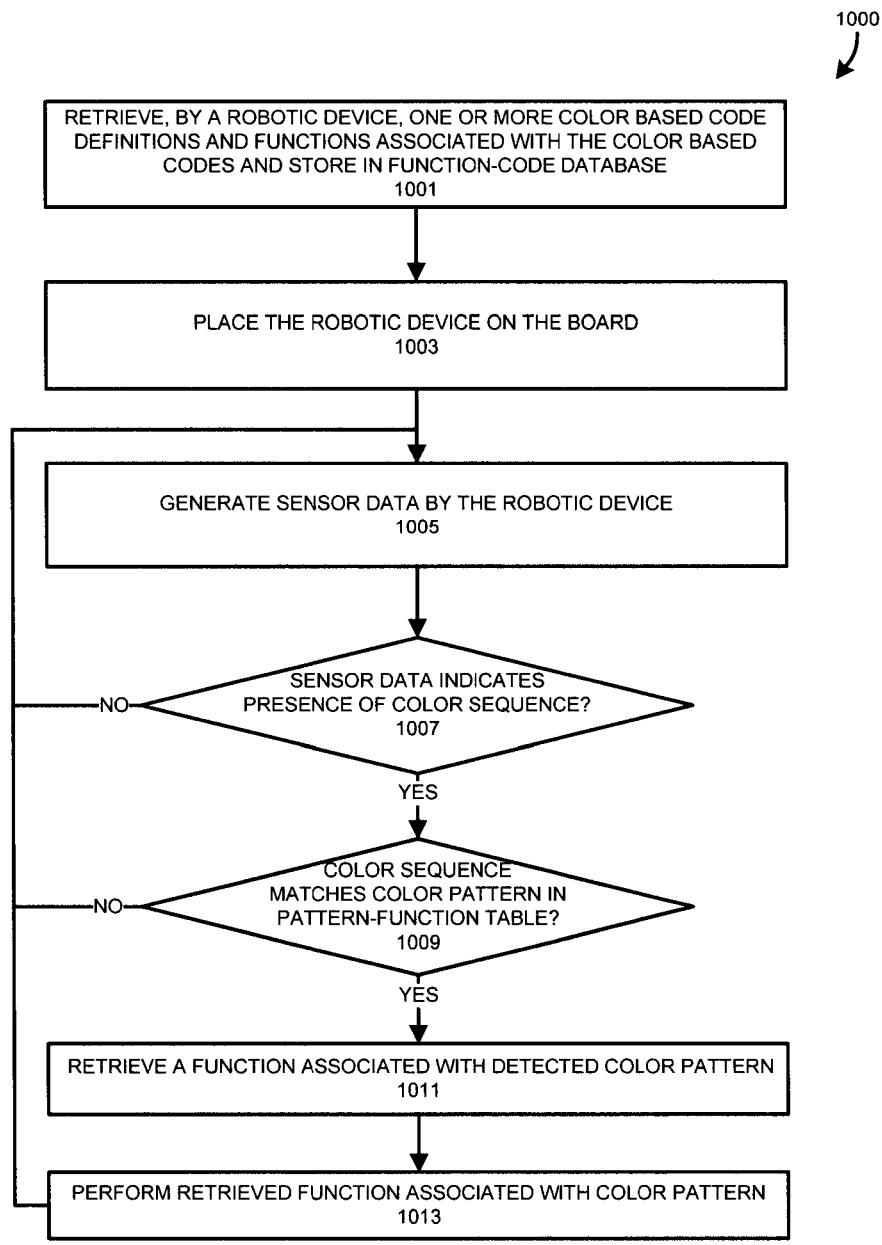
FIG. 10 shows a method for operating the robotic device to perform functions corresponding to detected color patterns according to one embodiment.

Although described above in relation to a line 105, in some embodiments, the robotic device 103 may detect color patterns 107 and perform functions irrespective of the presence of a line 105. For example, FIG. 10 shows a method 1000 for controlling the robotic device 103 using color patterns 107 according to one embodiment. Each operation of the method 1000 may be performed by one or more of the robotic device 103 and the board 101. For example, as noted above, the robotic device 103 may include an optical sensing module 323. As shown in FIG. 3A, the optical sensing module 323 may be stored in the memory unit 303 and be run/executed by the main system processor 301. FIG. 5 shows a component diagram of the components in the optical sensing module 323, which may be used to perform the various operations of the method 1000.

Although shown and described in a particular order, in some embodiments the operations of the method 1000 may be performed in a different order. For example, in some embodiments, two or more operations of the method 1000 may be performed concurrently or in partially overlapping time periods.

The method 1000 may commence at operation 1001 with the retrieval of one or more color pattern 107 definitions and corresponding functions. Operation 1001 may be similar or identical to operation 401 described above in relation to the method 400. As noted above, the color patterns 107 are sequences of colors that may be shown on the board 101. Using the sensors 305, in particular the color sensor 305A, the robotic device 103 may collect sensor data and compare this sensor data against the retrieved color pattern 107 definitions. As will be described in greater detail below, upon matching the sensor data to a color pattern 107 definition retrieved at operation 1001, a function corresponding to detected color pattern 107 may be performed by the robotic device 103.

At operation 1003, the robotic device 103 may be placed on the board 101 such that sensors 305 of the robotic device 103 are facing downwards onto the board 101. In particular, the robotic device 103 may be placed on a digital display device 205 of the board 101. In this position, the sensors 305 of the robotic device 103 may generate sensor data corresponding to light intensity and color data (i.e., light intensity at particular wavelengths) for use in detecting color patterns 107. In contrast to the method 400, the robotic device 101 is not placed on a line 105, but instead is positioned generally on the display device 205 or within a defined area on the display device 205 (e.g., a box designated to transfer color patterns 107 to the device 103).

At operation 1005, the robotic device 103 may generate sensor data using the sensors 305. For example, as noted above, the color sensor 305A may measure the intensity of detected light at particular wavelengths while the light sensors 305B may measure the intensity of light in a range of wavelengths. The detected light may be from light emitted by the board 101 (e.g., a digital board 101 such as a tablet computer). The sensors 305 may operate at 150 Hz to retrieve sensor data. In one embodiment, sensor data may be retrieved and/or recorded at operation 1005 by the sensor data unit 505.

At operation 1007, the sensor data continually retrieved at operation 1005 may be analyzed to determine the presence of a sequence of colors. In one embodiment, the pattern recognition unit 509 may obtain sensor data from the sensor data unit 505 and analyze the data for the presence of a sequence of colors at operation 1007. In particular, the color sensor 305A may generate color data over a specified time period (e.g., two seconds). This color data may indicate changes in color of detected light. For example, color sensor data may indicate a change from red to green over the time period.

Since, in comparison to the method 400, the robotic device 103 is not following a line 105, the device 103 may be motionless at operation 1005. Accordingly, the colors detected at operation 1007 may correspond to a dynamic color pattern 107B. In particular, in one embodiment, the entire surface of the digital display device 205 of the board 101 may be a single section 603 for a corresponding dynamic color pattern 107B. Accordingly, the entire surface of the digital display device 205 may define the area for one or more color patterns 107B. In this embodiment, the entire area of the digital display device 205 may continually flash/pulsate colors that may thereafter be detected by the robotic device 103.

In other embodiments, although the robotic device 103 may not be following a line 105, the robotic device 103 may be moving around the display device 205 in a specified or random fashion. In these embodiments, static color patterns 107A may be used/shown.

Although described as using color sensor data, as noted above, light intensity level data may also be used at operation 1007 to determine color changes/sequences. In particular, this light intensity data may be particularly useful for detecting grayscale colors and/or confirming the accuracy of color sensor data from the color sensor 305A.

After failing to detect a color sequence/change, the method 1000 may return to operation 1005 to continue to retrieve/generate sensor data. In contrast, upon detecting a color sequence at operation 1007, operation 1009 may query the pattern-function table 503 to determine if the color sequence corresponds to a color pattern 107 definition. Upon the color sequence failing to match a color pattern 107 definition, the method 400 may return to operation 1005 to continue retrieving sensor data.

Upon the detected color sequence matching a color pattern 107 definition, operation 1011 may retrieve a function corresponding to the matching color pattern 107 definition. The pattern recognition unit 509 may query the pattern-function table 503 with the detected color pattern 107 and retrieve an associated function at operation 1011. As noted above in relation to operation 1001, the pattern-function table 503 may include color pattern 107 definitions and associated functions for each pattern 107 definition. The functions may include different movement patterns for the robotic device 103 as described above. The function may thereafter be performed at operation 1013 using the function control unit 511. In this embodiment, the function control unit 511 may adjust driver 315 settings for the motors 313 or light controller 327 settings for the lights 329.

In one embodiment, the functions stored in the pattern-function table 503 and recognized by the robotic device 103 may include control commands for the robotic device 103 in addition to the example movement functions provided above. For example, the functions may include buffer control functions. A buffer control function may open a memory buffer of the robotic device 103 to store a set of patterns 107 and/or associated functions. The patterns 107 and functions may be stored until a corresponding end buffer function is detected/retrieved. The end buffer function may close the robotic device 103 buffer and instigate the playback/performance of the functions stored/buffered by the robotic device 103. Accordingly, the robotic device 103 may include the storage of multiple patterns 107 and functions, which may thereafter be sequentially performed at operation 1013 by the robotic device 103.

In some embodiments, the sequential performance of the functions at operation 1013 may be based on the delay between patterns 107. For example, a first pattern 107 associated with a first function may be detected at time T1 while a second pattern 107 associated with a second function may be detected at time T2. The difference between time T2 and time T1 may be ΔT. In this example, the first function may be performed followed by a delay of ΔT, after which the second function may be performed. Accordingly, performance of functions may correspond to the time sequence during which corresponding color patterns 107 were detected.

As described above, a robot activity system 100 is described that uses color patterns 107 to control the movement of a robotic device 103. In particular, the robotic device 103 is capable of detecting color patterns 107 on a digital or non-digital board 101 using a set of color and light sensors 305. The patterns 107 may be used to determine functions to be performed by the robotic device 103 while moving along or stationary on the board 101. The functions allow the robotic device 103 to move in a variable and/or controlled fashion while playing a game or for the general amusement of the user.

As explained above, an embodiment of the invention may be an article of manufacture in which a machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting.

What is claimed is:

1. A method for driving an autonomous robotic device, comprising:
    generating light sensor data by a set of light sensors coupled to a bottom face of the autonomous robotic device, wherein the light sensor data corresponds to detected light that is emitted upward from or is reflected upward from a surface upon which the autonomous robotic device is placed;
    following, by the autonomous robotic device, a line shown on the surface, using the light sensor data, and thereby causing a color sensor that is coupled to the bottom face of the autonomous robotic device to be positioned over the line or positioned to extend beyond the width of the line;
    generating color data by the color sensor, wherein the color data corresponds to a color of light that is emitted upward from or is reflected upward from the surface upon which the autonomous robotic device is placed; and
    using the color data to detect, by the autonomous robotic device, a color pattern included in the line shown on the surface or adjacent to the line shown on the surface;
    comparing, by the autonomous robotic device, the color pattern against a set of color pattern definitions;
    determining, by the autonomous robotic device, a match between the color pattern and a color pattern definition from the set of color pattern definitions;
    determining, by the autonomous robotic device, a function associated with the matched color pattern definition; and
    performing, by the autonomous robotic device, the function associated with the matched color pattern definition.

2. The method of claim 1, wherein the color pattern represents two or more separately colored sections aligned linearly along the line shown on the surface.

3. The method of claim 1, wherein the color pattern represents a single section of the line shown on the surface which displays a plurality of colors in a predefined time sequence.

4. The method of claim 1, wherein the color sensor is coupled to the bottom face of the autonomous robotic device at a midpoint of an arrangement of the set of light sensors along the bottom face of the autonomous robotic device and the autonomous robotic device follows the line shown on the surface such that the line bisects the arrangement of the set of light sensors along the bottom face of the autonomous robotic device.

5. The method of claim 1, wherein the function is one or more of
    1) altering the speed of the autonomous robotic device;
    2) causing the autonomous robotic device to turn by a specified degree;
    3) performing a movement sequence;
    4) causing the autonomous robotic device to count a predefined number of objects before performing a movement sequence;
    5) flashing a set of lights of the autonomous robotic device;
    6) causing the autonomous robotic device to communicate with another device;
    7) causing the autonomous robotic device to emit sounds;
    8) causing the autonomous robotic device to record sounds; and
    9) causing the autonomous robotic device to communicate with an accessory.

6. The method of claim 1, wherein each color pattern definition in the set of color pattern definitions includes a sequence of colors.

7. The method of claim 1, wherein the color sensor is positioned to extend beyond the width of the line and the color sensor detects the color pattern adjacent to the line.

8. The method of claim 1, wherein the color sensor is positioned over the line and the color sensor detects the color pattern included in the line.

9. The method of claim 1, further comprising a first color pattern positioned in the line and a second color pattern positioned adjacent to the line.

10. The method of claim 9, wherein the function associated with the matched color pattern definition of the first color pattern is different than the function associated with the matched color pattern definition of the second color pattern.

11. The method of claim 1, further comprising a first color pattern positioned adjacent to a first side of the line and a second color pattern positioned adjacent to a second side of the line.

12. The method of claim 11, wherein the function associated with the matched color pattern definition of the first color pattern is different than the function associated with the matched color pattern definition of the second color pattern.

13. An autonomous robotic device, comprising:
    a downward facing color sensor integrated within a bottom face of the autonomous robotic device to generate color sensor data corresponding to one or more colors in detected light that is emitted upward from or reflected upward from a surface upon which the autonomous robotic device is placed;
    a downward facing light sensor integrated within the bottom face of the autonomous robotic device to generate light sensor data;
    an electro-mechanical mechanism to autonomously move across the surface upon which the autonomous robotic device is placed while following a line detected on the surface using the light sensor data;

a pattern-function table to store a plurality of color pattern definitions and functions corresponding to each color pattern definition, wherein each color pattern definition defines a color pattern;

a pattern recognition unit to 1) detect the presence of one or more color patterns on the surface based on the color sensor data generated by the downward facing color sensor and 2) determine a function corresponding to the one or more detected color patterns by comparing the one or more detected color patterns against the plurality of color pattern definitions in the pattern-function table to determine a matching color pattern definition and the corresponding function; and a function control unit to perform the determined function.

14. The autonomous robotic device of claim 13, wherein the downward facing color sensor detects visible light and the color pattern definitions include multiple colors chosen from either a grayscale palette or a red-green-blue palette.

15. The autonomous robotic device of claim 13, wherein, if the determined function is an open buffer function, the autonomous robotic device stores subsequently detected functions and then performs the stored functions following detection of an end buffer function.

16. The autonomous robotic device of claim 13, wherein the determined function is one or more of:

1) altering the speed of the autonomous robotic device;
2) causing the autonomous robotic device to turn by a specified degree;
3) performing a movement sequence;
4) causing the autonomous robotic device to count a predefined number of objects before performing a movement sequence;
5) flashing a plurality of lights of the autonomous robotic device;
6) causing the autonomous robotic device to communicate with another device;
7) causing the autonomous robotic device to emit sounds;
8) causing the autonomous robotic device to record sounds; and
9) causing the autonomous robotic device to communicate with an accessory.

* * * * *